United States Patent [19]

Wiltrout

[11] 4,029,114

[45] June 14, 1977

[54] BACK FILTER AUTOMATIC VEHICLE WASH WATER RECLAIM SYSTEM

[75] Inventor: Dale E. Wiltrout, Wyckoff, N.J.

[73] Assignee: The Allen Group Inc., Melville, N.Y.

[22] Filed: Apr. 26, 1976

[21] Appl. No.: 680,216

[52] U.S. Cl. .............................. 134/104; 134/109; 134/123; 210/108

[51] Int. Cl.² ......................................... B08B 3/02

[58] Field of Search ............ 134/45, 104, 109, 111, 134/123; 210/108, 242, 275

[56] References Cited

UNITED STATES PATENTS 3,911,938   10/1975   Wiltrout ............................ 134/104

Primary Examiner—Robert L. Bleutge
Attorney, Agent, or Firm—Fulwider Patton Rieber Lee & Utecht

[57] ABSTRACT

The back filter automatic vehicle wash water reclaim system of the present invention is adapted for receiving drain water from an automatic car wash bay and includes a plurality of pairs of back wash filter tanks which are connected together in a manner which will provide for filter flow in a forward direction through a pair of such tanks and will then provide for reverse flow of the entire flow volume in reverse direction through a single filtering tank to thereby back wash such filtering tank.

5 Claims, 1 Drawing Figure

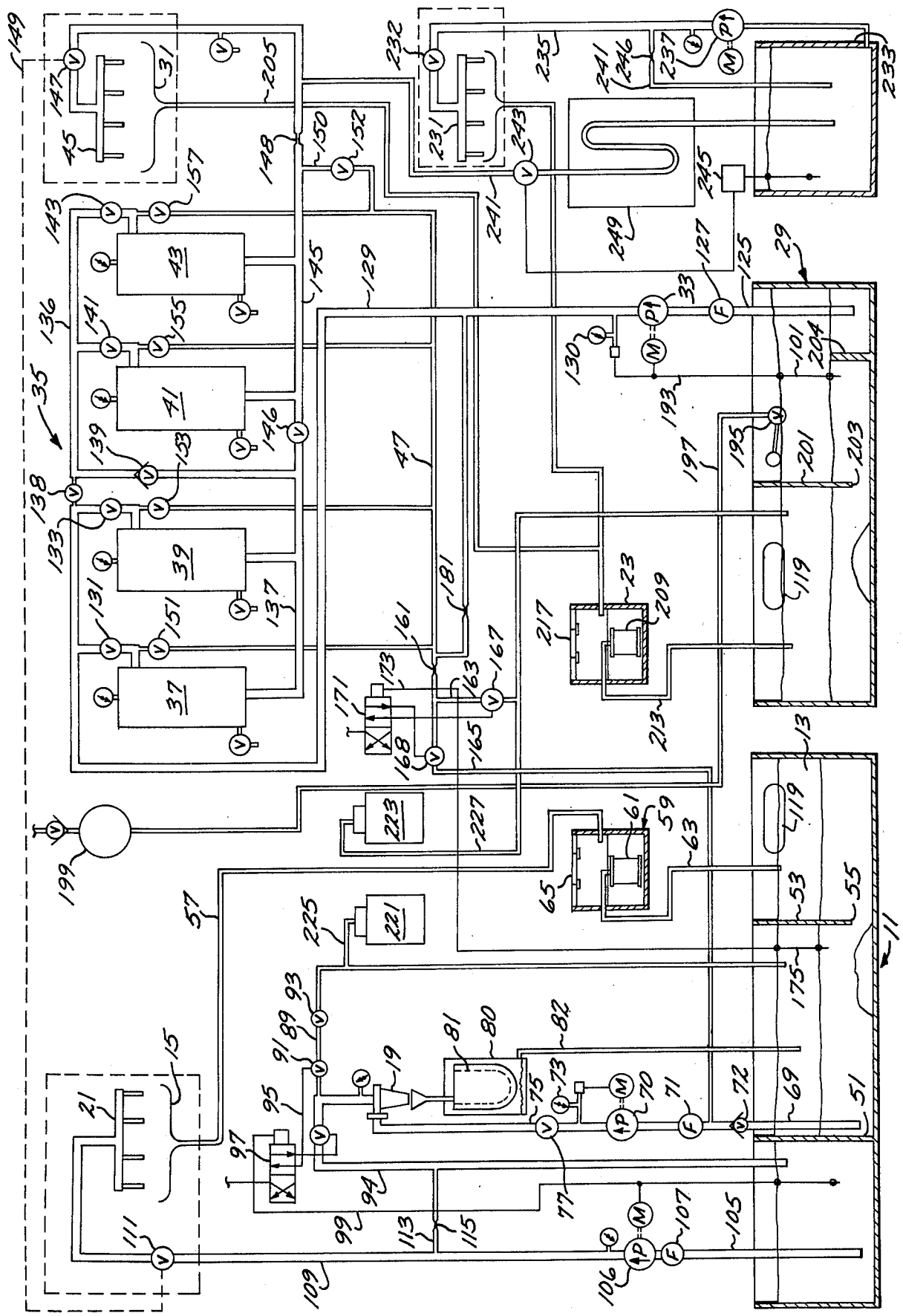

BACK FILTER AUTOMATIC VEHICLE WASH WATER RECLAIM SYSTEM

BACKGROUND OF THE INVENTION

1. Field of the Invention

As described in my U.S. Pat. No. 3,911,938, issued October 14, 1975, with the present day high cost of labor, automatic vehicle wash devices have gained significant popularity. However, since such mechanisms frequently require the use of high volumes of water in order to provide for adequate washing of the vehicle, many state and municipal governments have enacted pollution control legislation limiting the use of fresh water in such automatic car wash devices and closely restricting effluents released therefrom. Accordingly, a great demand has arisen for the treatment of water used in such car wash devices in order to reclaim such water for subsequent use and limit, if not entirely eliminate, the dumping thereof into municipal sewage systems.

2. Description of the Prior Art

Numerous efforts have been made to provide for efficient reclaim of water used in the washing of vehicles and such efforts have conventionally led to systems employing various types of filters. However, with the high cost of replacement filters it has been necessary to incorporate filters of the type that are capable of being periodically back washed in order to revitalize such filters for subsequent filtering. Conventionally, such back wash has been accomplished by the use of fresh water from the municipal water supply, thus unnecessarily consuming fresh water and significantly detracting from the performance of the system in conserving water. In my aforementioned U.S. Pat. No. 3,911,938, I disclose an arrangement for utilizing four identically sized filter tanks, three of which are utilized to back wash a single tank. However, equal capacity filter tanks may be connected together for forward flow through one to clean the water and reverse flow through the other to provide for cleaning of the filter itself, thus conserving cleaning time and minimizing down time required for such cleaning. Further, it has been found extremely advantageous to direct the back wash water through the sludge separator prior to return to the water sumps to thereby minimize contamination of the sumps and minimize the cleaning requirements thereof.

SUMMARY OF THE INVENTION

The back wash automatic vehicle wash water reclaim system of the present invention is characterized by a pair of back washable filter tanks having their inlets connected in parallel by means of a rinse conduit leading from a rinse sump and having a rinse pump incorporated therein. A back wash conduit connects the outlet of each tank with the outlet of the other tank and further connects the outlet of each tank with the inlet to a sludge separator which returns water separated from the sludge to a wash sump for storage thereof for use in subsequently spraying through a wash spray arch for washing subsequent vehicles.

DESCRIPTION OF THE DRAWING

The single FIGURE in the drawing is a schematic diagram of an automatic vehicle wash water reclaim system embodying the present invention.

DESCRIPTION OF THE PREFERRED EMBODIMENT

General Construction

The backwash filter automatic vehicle wash water reclaim system of the present invention includes, generally, a wash sump 11 separated into a collector compartment 13 which receives water from a wash bay drain 15 through screening pit 59 and a clean water compartment 17 which receives water from a sludge separator 19 and has water drawn therefrom for spraying through a wash spray arch 21. A rinse sump 29 has water fed thereto from a rinse drain 31 through screening pit 23 and water drawn therefrom by means of an automatic rinse pump 33 which directs such water through a filtering arrangement 35 including a pair of normally parallel connected first stage filter tanks 37 and 39 which are normally connected in series with a pair of parallel connected second stage filter tanks 41 and 43. The outlets from the second stage filter tanks 41 and 43 are normally connected with a primary rinse spray arch 45 and the inlets of the filter tanks 37, 39, 41 and 43 may selectively be connected with a back wash manifold 47 leading selectively to either the rinse sump 29 or separator 19. Consequently, water drained from the wash bay drain 15 may be selectively withdrawn from the sump 11 and directed through the sludge separator 19 to separate the sludge therefrom and return the clean water back to the clean water compartment 17 for subsequent withdrawal to spray through the wash arch 21 or recirculated back to the main holding sump 11 through separator 19. Similarly, used water may selectively be withdrawn from the rinse sump 29 for direction through the parallel connected first stage filter tanks 37 and 39 and subsequent direction through the parallel connected second stage filter tanks 41 and 43 to pressurize the rinse spray arch 45. After a period of use, it becomes necessary to back wash the filter tanks 37, 39, 41 and 43 and each such filter tank may be individually back washed by adjusting the valving arrangement thereto to direct the water from the rinse pump 33 in a forward direction through the first stage filters 37 and 39 and in a reverse direction through the second stage filters 41 and 43 and back to either the rinse sump 29 or separator 19.

Wash System

The wash sump 11 is normally disposed below the level of the wash bay and in order to accommodate the volume of water necessarily recycled from a high speed vehicle wash apparatus, such sump is normally 6 or 7 feet deep. The sump 11 is separated by means of a partition 51 to form the collector and clean water compartments 13 and 17, respectively, and a skimmer baffle 53 extends transversely across and projects downwardly in the collector compartment 13 to terminate in a lower edge 55 spaced approximately two feet from the bottom wall of the sump 11. Used water from the wash bay drain 15 is fed therefrom through a drain conduit 57 which dumps into the relatively shallow 2 foot deep screening pit disposed at ground level and having a cylindrically shaped filter screen 61 disposed therein. Leading from the core of the filter screen 61 is a sump conduit 63 which leads to the wash sump 11 on one side of the skimmer 53. A metal plate 65 covers the access opening in the top of the screening pit 59 to enable convenient removal of the filter screen 61 for cleaning or replacement thereof.

Leading from the collector compartment 13 on the side of the skimmer 53 opposite the side on which the sump conduit 63 dumps is a withdrawal conduit 69 connected with a separator pump 70 and having a filter 71 therein. Such withdrawal conduit also includes a check valve 72 for blocking back flow into the sump 11 from the back wash manifold 47. A pressure sensor 73 senses the pressure discharge of the pump 70 and is responsive to a predetermined pressure drop to render such pump 70 inoperative thereby signalling the operator, by audio and visual means, that the filter 71 has been sufficiently clogged to restrict flow to the pump 23 below the desired level. A separator conduit 75 leads from the outlet of the pump 23 to the inlet of the sludge separator 19 and includes a shut-off valve 77.

The sludge separator 19 is in the form of a centrifugal separator and has its sludge outlet connected with the top of a bag filter, generally designated 70. The bag filter 79 includes a decant tank 80 mounting an upwardly opening cylindrical bag retainer therein for receipt of a 25 micron filter bag 81. An overflow pipe 82 leads from the lower portion of the tank 80 and back to the collector compartment 13.

The water outlet from the sludge separator 19 is connected with a recycle conduit 89 leading back to the collector compartment 13 and including a pneumatically operated, normally open valve 91 and a manual adjustment valve 93. The outlet from such separator is also connected with a clean water return conduit 94 including a normally closed pneumatic operated valve 95. The pneumatic valves 91 and 95 are controlled by a spool valve 97 having a sensing line 99 projecting therefrom to connect with a high and low water level sensor 101 disposed in the clean water compartment 17 for automatic actuation of such valves 91 and 95 to direct water to either the clean water compartment 17 or recirculate to the collector compartment 13 where chemicals are injected, depending upon the demand for such water in such clean water compartment.

A take-up pipe 105 leads from the clean water compartment 17 to the wash pump 106 and includes a filter 107, the outlet from such pump being connected with the wash arch 21 by means of a wash conduit 109 including a solenoid actuated valve 111. A block back conduit 113 branches off from the wash conduit 109 and connects with the clean water return conduit 94, such blow back conduit including a flow control valve 115 which is responsive to the pressure in such wash conduit 109 to control the block back rate thereby enabling the wash pump 25 to be operated at a constant speed without overheating while maintaining a substantially constant pressure at the wash arch 21. Floating on the water in the collector compartment 13 is an oil and wax absorbing pillow 119.

Rinse System

A take-up conduit 125 leads from the rinse sump 29 to the inlet of the rinse water pump 33 and includes a filter 127, the outlet from such pump being connected in parallel with the inlets to the first stage filter tanks 37 and 39 by means of a rinse conduit 129.

A pressure sensor 130 is connected to the discharge of the rinse pump 33 to sense the pressure thereof and turn such pump off and turn on an audio and visual alarm when the pressure drop thereacross falls below a predetermined level to thereby indicate clogging of the filter 127 and inadequate pressure and flow for the system to operate properly.

A level sensor 191 is disposed in the rinse sump 29 and a sensor line 193 leads therefrom to a control panel (not shown). Water flow to the inlets of the filter tanks 37 and 39 is controlled by respective air actuated valves 131 and 133. The outlets from the respective tanks 37 and 39 are connected in parallel by means of a first stage outlet conduit 137 and a second stage inlet conduit 136 which connects with the inlets to the respective second stage filters 41 and 43, such conduit 137 including a one-way check valve 139. A pneumatic operated rinse valve 138 connects the rinse conduit 129 with the second stage inlet conduit 136. Flow of rinse water to the respective inlets of the second stage filter tanks 41 and 43 is controlled by respective air actuated valves 141 and 143. The outlets from the second stage filter tanks 41 and 43 are connected together by means of a rinse conduit 145 leading to the rinse arch 45 and including a flow control valve 148 and an air actuated valve 147, the arch control valves 111 and 147 being connected with a pneumatic line 149. The rinse conduit 145 is connected with the first stage conduit 137 by means of a wash conduit including a pneumatic wash valve 146. A purge conduit 150 branches off from the rinse conduit 145 and leads to the back wash manifold 47 and includes a purge valve 152.

The inlets to the respective filter tanks 37, 39, 41 and 43 are connected with the back wash manifold 47, the flow from each inlet being controlled by respective back wash valves 151, 153, 155 and 157. The back wash manifold 47 includes a flow control valve 161 and branches into a rinse sump return line 163 and a wash sump return line 165, such lines including respective pneumatic normally open and normally closed valves 167 and 169. The valves 167 and 169 are operated by means of a spool valve 171 having a sensing line 173 leading therefrom and through a level sensor 175 which senses the water level in the collector compartment 13 to signal the need for make-up water in the wash sump 11. It will be noted that a blow back conduit 179 branches off from the rinse conduit 129 and includes a flow control valve 181 which controls flow into the rinse sump return line 163 to thereby provide bypass from the rinse pump 33, and to transfer excess rinse water back to the sump 11.

A float valve 195 is disposed in such rinse sump 29 and controls flow from a fresh water conduit 197 leading from a water softener 199 for providing softened make-up water to the sump 29 as water evaporates during use and/or is carried from the rinse bay by vehicles being washed.

A skimmer baffle 201 projects transversely cross the sump 29 and depends downwardly from the top thereof to terminate in a lower edge 203 spaced approximately 2 feet above the bottom of such sump 29 to provide for passage thereunder of water returned to the sump for subsequent withdrawal through the withdrawal conduit 123. Additionally, an upstanding mud baffle 204 projects transversely across the bottom wall of the rinse sump 29.

A drain conduit 205 leads from the rinse drain 31 to the rinse screen pit 23 having a removable cylindrical rinse screen 209 therein. A sump conduit 213 leads from the top of the screen 209 for returning water to the rinse sump 29. As in the case of the screen pit 59, the access opening in the top wall thereof is covered by a removable metal plate 217 to provide for convenient removal of the screen 208 for cleaning.

A pair of wash and rinse chemical feeders 221 and 223 are connected with the wash recycle conduit 89 to the wash sump 11 by means of a conduit 225 and with the rinse sump 29 by means of a chemical feed conduit 227, respectively, for selectively adding chemicals to treat the water in the respective sumps 11 and 29 to improve water quality. An oil and wax absorbing pillow 119 is also disposed in the rinse sump 29.

A final rinse arch 231 may be provided for rinsing the vehicles after they pass the primary rinse arch 45 and such arch is connected with a final rinse sump 233 by means of a final rinse conduit 235 incorporating a final rinse sump 237. A blowby conduit 241 branches off from the final rinse conduit 235 and incorporates a flow control valve 243 for maintaining a substantially constant pressure at the arch 231 irrespective of the speed of the pump 237.

Water is supplied to the final rinse sump 233 through a supply conduit 241 which branches off from the conduit 145 leading to the primary rinse arch 45 and incorporating a flow control valve 243 operated by a level sensor 245 which senses and maintains the desired water level in the sump 233. The supply conduit 241 is connected with a reverse osmosis purifier 249 which discharges directly into the sump 233.

Operation

In operation, the sumps 11 and 29 are filled to the desired level with water and the system energized and pressurized to commence automatic operation thereof. As a vehicle moves along the vehicle path into the wash bay, a sensor (not shown) is contacted to open the pneumatic wash and rinse valves 111 and 147 respectively to direct water to the arches 21 and 45 to spray water on such vehicle as it travels through the wash and rinse bays. Wash water draining from the vehicle is collected in the drain 15 and fed into the screen pit 59 where the screen serves to screen out larger particles of foreign material and return the screened, used water to the collector compartment 13 through the conduit 63. It will be appreciated that such returning water carries sludge, grit, wax and oil and such wax and oil will normally float on the water to be retained behind the skimmer 53 within the collector compartment 13 and be absorbed by the oil pillow 119. A portion of the sludge carried in the returning water will be deposited out as such water passes beneath the lower edge 55 of the skimmer 53 for withdrawal from such compartment by means of the separator pump 23.

Water withdrawn through the separator pump 70 is fed into the centrifugal sludge separator 19 and the separated sludge deposited in the filter bag 81 and the clean water directed upwardly to normally be conducted through the open recycle valve 91 where it is chemically treated then recycled back to the collector compartment 13 for subsequent recycling to the separator 19. However, when the water level in the clean water compartment 17 drops sufficiently low to cause the level sensor 101 to signal the control valve 97, the recycle valve 91 will be closed and the make-up valve 95 opened to thereby direct the water from the separator 19 back to the clean water return conduit 94 to the clean water compartment 17 for subsequent withdrawal to the wash arch 21.

It will be appreciated that the rinse pump 33 normally directs water through the filter conduit 129 and through the inlets to the first stage filter tanks 37 and 39 to flow such water forwardly through such filters for discharge from the outlets thereof and to the inlets to the second stage filters 41 and 43 thereby providing for double filtering of the water. The water discharged from the second stage filter tanks 41 and 43 is directed through the rinse conduit 145 to the rinse arch 45 to rinse the car as it passes through the rinse bay. Water collected from the rinse drain 31 is directed to the rinse screen pit 23 to return to the rinse sump 29 from where it passes beneath the skimmer 201 for subsequent withdrawal to the rinse pump 33.

After a period of use, the filter media in the tanks 37, 39, 41 and 43 needs cleaning and such filter tanks may be conveniently reactivated by back flowing thereof. When it is desirable to back flow the filter tank 37, the remaining filter tanks 39, 41 and 43 may be connected in parallel by closing the filter inlet valve 131 and opening the valves 146 and 138. Operation of the rinse pump 33 will then flow water in a downward direction through the filter tanks 39, 41 and 43 and in an upward direction through the first stage filter tank 37 for exit from the inlet of such filter tank and through the back wash valve 151 to the back wash manifold 47. The water flowing through the back wash manifold 47 will normally be directed through the wash sump return valve 169 to the wash sump 11 but when the wash level sensor 175 detects a high water level in the wash sump 11, the control valve 171 will shift, thereby closing the wash sump valve 169 and opening the rinse sump valve 167 to direct water to such rinse sump 29. It will be appreciated that the remaining filter tanks 39, 41 and 43 may be back washed in a similar manner, each one at a time.

After back washing of each individual filter tank 37, 39, 41 and 43 has been completed, it is desirable to purge all such filter tanks by flowing water downwardly therethrough. This is accomplished by opening all the inlet valves 131, 133, 141 and 143 and closing all the back wash valves 151, 153, 155 and 157. Also, the purge valve 152 is open and the rinse pump 33 actuated to flow water through the filter conduit 129 and in a downward direction through all filter tanks.

The final rinse is provided by the final rinse arch 231 by actuation of the final rinse pump 237 and opening of the control valve 232 for supplying water to the final rinse arch 231. As the level of the water in the sump 233 lowers, the sensor 245 will actuate the supply pump 245 to draw water from the primary rinse arch supply line 145 to direct it through the de-mineralizer 249 for de-mineralization thereof and replenishing the supply in the final rinse sump 233.

As operation of the system continues, water sprayed from the arches 21 and 45 will be evaporated or carried away by the vehicles leaving the wash facilities, thereby necessitating addition of make-up water. The drop in water level within the rinse sump 29 will be sensed by the float valve 195 to admit such make-up water. Also, it will be apparent that, if desirable, a fresh water line may be connected directly to the suction of the wash and rinse pumps 23 and 33 respectively for priming, blow-back clean out of the suction and refill of the sumps.

From the foregoing, it will be apparent that the back filter automatic vehicle wash water reclaim system of the present invention provides an economical and convenient means for reclaiming water from a vehicle wash installation and proceeding such water for re-use, thereby substantially decreasing the expense of adding fresh water and lessening the sewage disposal requirement of the installation. The system of the present invention is relatively foolproof in operation and requires very little operator attention.

Obviously, many modifications and variations of the present invention may be made with regard to the foregoing detailed description without departing from the spirit of the invention.

I claim:

1. A back wash filter automatic vehicle wash water reclaim systems comprising:
    wash spray means for spraying water onto a vehicle passing through a wash bay formed in a vehicle path;
    wash sump means disposed below the level of said vehicle path for collecting used water from said vehicle path and including partition means separating said sump means into a collector compartment and a clean water compartment;
    wash drain means for draining water from said vehicle path into said collector compartment;
    wash conduit means connected between said clean water compartment and said wash spray means and including wash pump means for drawing water from said sump and spraying it through said spray means;
    a sludge separator for separating water from sludge;
    separator conduit means leading from said collector compartment to the inlet of said sludge separator and including separator pump means;
    clean water conduit means leading from the water outlet of said sludge separator to said clean water compartment;
    primary rinse spray means for spraying rinse water on a vehicle passing through a rinse bay formed in said veicle path forwardly along said path from said wash bay;
    rinse sump means including partition means separating said rinse sump means into a rinse water collector compartment and a rinse clean water compartment;
    drain means for draining used rinse water from said rinse bay to said rinse sump means;
    rinse conduit means leading from said clean rinse water compartment and including a rinse pump means;
    a plurality of reverse flow filter tank sets having a forward and reverse flow direction;
    filter conduit means leading from the discharge side of said rinse pump and connecting said filter tank sets in series with one another and the outlets of each set with the inlet of each other set and connecting the outlet of at least the last set of the series with said rinse spray means:
    back wash conduit means connecting said filter tank inlets with one of said rinse sump means;
    individual valve means in said filter and back wash conduit means for controlling flow from said rinse pump means to the inlets of said respective filter tank inlets and operative during filtering of said wash water to direct water forwardly in series through said tank sets and to said rinse spray means, said valve means being further operative during back wash of said tanks to selectively direct flow forwardly through selected ones of said sets and in the reverse direction through another of said filter tank sets; and
    control means for controlling said wash pump, separator pump, wash and rinse pumps and valve means and having a rinse mode operative to direct water through said rinse pump and in series through said sets of filter tanks to said rinse spray means, said control means further having a back wash mode operative to direct water through said rinse pump means and forwardly through one of said sets and in a reverse direction through the other of said filter tank sets through said back wash conduit means to said one of said sumps.

2. A back wash filter automatic vehicle wash water reclaim system as set forth in claim 1 wherein:
    said back wash conduit means connects to said wash sump means by connecting with said separator means to direct back wash water through said sludge separator to be fed back to said clean water compartment.

3. A back wash filter automatic vehicle wash water reclaim system as set forth in claim 1 wherein:
    said separator includes a decant tank housing having its inlet connected with said separator for receiving sludge discharged therefrom, a filtration bag for receiving said sludge and an overflow pipe leading from said tank to said wash sump means for returning water drained from said bag back to said wash sump means.

4. A back wash filter automatic vehicle wash water reclaim system as set forth in claim 1 wherein:
    said filter tank sets include first and second pairs of filter tanks, the tanks of each pair being connected together in parallel and the first and second pairs being connected together in series; and
    said back wash conduit means connects to said wash sump means by connecting with said separator means to direct back wash water through said sludge separator to be fed through said sludge separator to have sludge separated therefrom prior to being returned to said clean water compartment.

5. A back wash filter automatic vehicle wash water reclaim system as set forth in claim 1 that includes:
    a final rinse spray means disposed over said wash bay and spaced from said primary spray means;
    final rinse drain means for receiving used rinse water from said rinse spray means;
    final rinse sump means connected with said final rinse drain means for receiving and storing water received therefrom;
    final rinse water supply means for supplying final rinse water to said final rinse sump means; and
    de-mineralizer means connected with said water supply means.

* * * * *